(12) United States Patent
Donoho

(10) Patent No.: US 11,166,450 B2
(45) Date of Patent: Nov. 9, 2021

(54) DEVICES AND METHODS FOR REPELLING AVIAN PESTS

(71) Applicant: Bird-B-Gone, Inc., Mission Viejo, CA (US)

(72) Inventor: Bruce Donoho, Mission Viejo, CA (US)

(73) Assignee: BIRD B GONE LLC, Santa Ana, CA (US)

( * ) Notice: Subject to any disclaimer, the term of this patent is extended or adjusted under 35 U.S.C. 154(b) by 0 days.

(21) Appl. No.: 15/797,631

(22) Filed: Oct. 30, 2017

(65) Prior Publication Data

US 2018/0116203 A1    May 3, 2018

Related U.S. Application Data

(60) Provisional application No. 62/416,232, filed on Nov. 2, 2016.

(51) Int. Cl.
| | | |
|---|---|---|
| *A01M 29/32* | (2011.01) | |
| *F16M 13/02* | (2006.01) | |
| *B29C 45/14* | (2006.01) | |
| *F16B 1/00* | (2006.01) | |
| *F16B 2/02* | (2006.01) | |
| *B29C 45/00* | (2006.01) | |
| *F16B 17/00* | (2006.01) | |

(52) U.S. Cl.
CPC ....... *A01M 29/32* (2013.01); *B29C 45/14426* (2013.01); *F16B 1/00* (2013.01); *F16M 13/022* (2013.01); *B29C 45/0055* (2013.01); *F16B 2/02* (2013.01); *F16B 17/006* (2013.01); *F16B 2001/0035* (2013.01)

(58) Field of Classification Search
CPC ......... A01M 29/26; A01M 29/32; E04B 1/72; E04D 13/004
See application file for complete search history.

(56) References Cited

U.S. PATENT DOCUMENTS

| | | | | | |
|---|---|---|---|---|---|
| 2,475,047 | A | * | 7/1949 | Peles | A01M 29/32 52/101 |
| 2,888,716 | A | * | 6/1959 | Kaufmann | A01M 29/30 52/101 |
| 3,282,000 | A | * | 11/1966 | Shaw | E04D 13/004 43/77 |
| 3,407,550 | A | * | 10/1968 | Shaw | A01M 29/32 52/101 |
| 4,088,156 | A | | 5/1978 | Kubo et al. | |
| 5,253,444 | A | * | 10/1993 | Donoho | A01M 29/32 43/1 |
| 5,400,552 | A | * | 3/1995 | Negre | A01M 29/32 52/101 |
| 5,433,029 | A | * | 7/1995 | Donoho | A01M 29/32 256/11 |

(Continued)

FOREIGN PATENT DOCUMENTS

| | | |
|---|---|---|
| GB | 2432412 | 10/2009 |
| WO | 2005029955 | 4/2005 |

*Primary Examiner* — Paola Agudelo
(74) *Attorney, Agent, or Firm* — Fish IP Law, LLP

(57) ABSTRACT

A device for deterring avian pests includes first and second spikes, each having a terminal retention feature held within an injection molded base. The spikes are preferably arranged in a radial fashion, extending outward from the molded base.

8 Claims, 4 Drawing Sheets

(56) References Cited

U.S. PATENT DOCUMENTS

| | | | | |
|---|---|---|---|---|
| 6,006,698 | A * | 12/1999 | Negre | A01M 29/26 |
| | | | | 119/537 |
| 6,250,023 | B1 * | 6/2001 | Donoho | A01M 29/26 |
| | | | | 52/101 |
| 6,546,676 | B2 | 4/2003 | Wiesener et al. | |
| 7,120,984 | B2 | 10/2006 | Rutsch | |
| 7,243,465 | B2 | 7/2007 | Donoho | |
| 7,802,405 | B1 * | 9/2010 | Donoho | A01M 29/32 |
| | | | | 52/100 |
| 8,479,456 | B1 * | 7/2013 | Donoho | E04B 1/72 |
| | | | | 43/1 |
| 9,232,851 | B2 | 1/2016 | Manici | |
| 2003/0172575 | A1 * | 9/2003 | Donoho | A01M 29/32 |
| | | | | 43/1 |
| 2003/0208967 | A1 | 11/2003 | Riddell | |
| 2004/0216393 | A1 | 11/2004 | Hall et al. | |
| 2005/0160685 | A1 * | 7/2005 | Donoho | A01M 29/32 |
| | | | | 52/101 |
| 2014/0041318 | A1 * | 2/2014 | Donoho | A01M 29/32 |
| | | | | 52/101 |
| 2015/0375448 | A1 | 12/2015 | Wilson et al. | |

* cited by examiner

DEVICES AND METHODS FOR REPELLING AVIAN PESTS

This application claims the benefit of priority of U.S. Provisional Application No. 62/416,232, filed on Nov. 2, 2016. This and all other extrinsic materials discussed herein are incorporated by reference in their entirety.

FIELD OF THE INVENTION

The field of the invention is barrier devices for discouraging roosting by avian pests.

BACKGROUND

This background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The presence of birds on window sills, roof tops, boat masts, and other surfaces is often undesirable. Among other things, birds tend to be noisy and make an unsightly mess that can attract insects, and provide a fertile bed for bacteria which can present a significant health hazard. Additionally, the unaesthetic appearance of bird droppings and the like often requires unpleasant and time consuming clean up where access to the droppings is available. Often, areas contaminated with bird droppings and other by-products of birds are not readily accessible for clean up.

It is known to mount a plurality of pointed objects, such as spikes and the like, on surfaces where it is desired to repel birds. See, e.g, U.S. Pat. Appl. 2004/0216393 to Hall, et al. (publ. November 2004), and UK Patent No. 2432412B to Jones. However, traditional bird repellent devices comprise a metal base with a plurality of angularly and upwardly projecting metal wires or spikes. Unfortunately, such metal contraptions, while accomplishing the desired result, tend to be costly to manufacture because they are not conducive to non-labor intensive manufacturing processes, for example by injection molding.

Although various plastic bird repellant devices are known such as those described in U.S. Pat. No. 7,243,465 to Donoho, U.S. Pat. Appl. No. 2003/0208967 to Riddell, U.S. Pat. No. 6,546,676 to Wiesener et al. and WIPO Publ. No. 2005/029955 to Knight (publ. April 2005), such devices suffer from one or more disadvantages including, for example, a higher cost of shipment due to their inability to stack and weight of the plastic.

One approach to resolving these issues is found in U.S. Pat. No. 8,601,747 to Donoho (granted December 2013), which describes a deterrent device having a base that supports a set of radially arranged spikes. Such a device, however, can be labor intensive to assemble.

Thus, there is still a need for safe and effective bird deterring device having metal spikes or prongs that can be manufactured via automation.

SUMMARY OF THE INVENTION

The inventive subject matter provides a device and a method for deterring avian pests. Preferred devices include first and second spikes, each having a terminal retention feature disposed in an injection molded base. The spikes preferably extend from the base in a radial fashion.

Preferred methods of manufacturing include securing the terminal retention features in a temporary retaining device, then injection molding a base around the terminal retention features, and then arranging the first spike and the second spike in a radial fashion that extends outward from the base.

In especially preferred methods, a set of spikes is arranged in a comb, and the base of the comb is encapsulated in a moldable material by insertion molding. As described above, the spikes are then arranged in a radial fashion that extends outward from the base.

DETAILED DESCRIPTION

Figure 1:
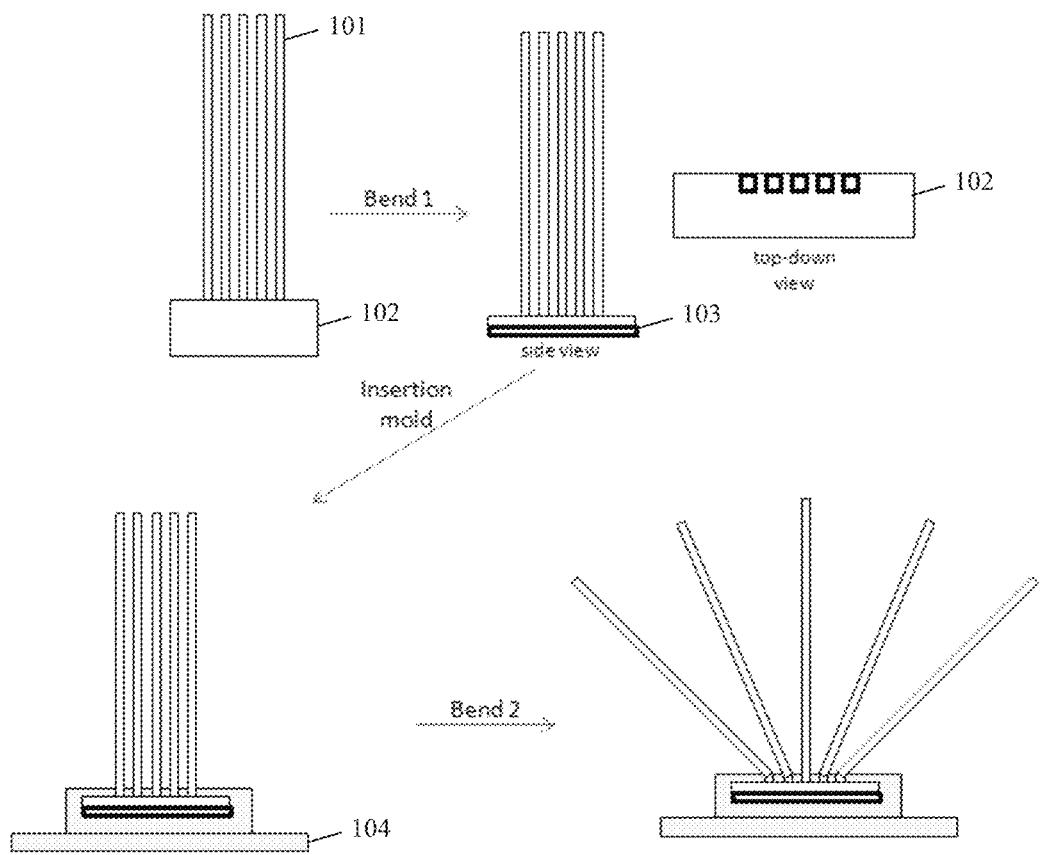
FIG. 1 is an embodiment of the present invention having spike structures in a compact, comb-like orientation for insertion molding purposes, with the protruding portion of the spike assembly being bent or otherwise formed into the desired configuration after injection.

The following description includes information that may be useful in understanding the present invention. It is not an admission that any of the information provided herein is prior art or relevant to the presently claimed invention, or that any publication specifically or implicitly referenced is prior art.

The inventive subject matter provides devices, systems and methods in which a bird repellant device having a plurality of spikes that can be readily manufactured using automated or semi-automated methods. Suitable manufacturing methods include, for example, insertion molding. For example, the base portion of such devices can be a product of injection of a molten material (e.g. plastic) into a mold designed to accommodate one or more spikes (e.g., metal spikes or equivalent structures), with the spikes held in place once the molded material hardens.

In such an insertion molding method, 1, 2, 3, 4, 5, 6, or more spikes can be provided in a form that temporarily holds them in a fixed orientation relative to one another, and that is suitable for insertion into a mold. Individual spikes preferably include terminal protrusions, bends or other features that secure them in a hardened base material following release from the mold. In other embodiments, the spikes can be provided as an extension from a base that provides fixation within the molded material.

Spikes can be provided as a continuous, bent wire, and can include bends or loops that extend into the molded material, with the exposed portions of the continuous, bent wire being trimmed manually or automatically to form individual spikes following injection into the mold.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In one embodiment of the inventive concept, spikes can be provided as individual spike units that include a fixation feature that provides support once the molded portion of the device has become solid. For example, such a spike can include a protrusion, a loop, or a disc that is encapsulated by a molded base. Alternatively, such individual spikes can have an essentially constant diameter but include a looped or bent portion at one end that is inserted into the mold prior to injection. Individual spikes are preferably held in an orientation defined by the mold in a temporary fashion, such that the individual spikes can be readily released following injection of the material used to form the base. For example, a set of individual spikes made of magnetically responsive material can be held in a suitable orientation using one or more magnets (e.g. electromagnets or permanent magnets) from which the individual spikes can be released following injection. Similarly, a set of individual spikes can be suitably oriented on an adhesive or tacky surface.

In other embodiments, a set of individual spikes can be suitably oriented using a clamp or a series of clamps, which can be actuated to facilitate automated assembly. Similarly, a set of individual spikes can be oriented by embedding them within a friable and/or a soluble matrix that can be readily removed following injection. It should be appreciated that such devices and methods can be adapted to accommodate molds that present a series of bird repelling devices in a linear or other array, for example, a linear strip of bird repellent devices. For example, such devices and methods can be positioned in a series or other arrangement that orients two or more sets of individual spikes over portions of a complex mold, which includes both base regions, and couples different base regions to one another.

In yet another embodiment of the inventive concept, individual spikes are positioned as part of a spike assembly, a portion of which is inserted into a mold that provides the base of the bird deterrent device. In such an embodiment, individual spike structures can extend from the spike base. The spike base is inserted into the injection mold and provides support for the individual spike structures following injection. In such an embodiment, the spike structures can be provided in a radial arrangement that reflects the orientation of spikes in the final bird repellent device. In some embodiments, the spike assembly can provide the spike structures in a compact, comb-like orientation for insertion molding purposes, with the protruding portion of the spike assembly being bent or otherwise formed into the desired configuration after injection. An example of such an embodiment is shown in FIG. 1, where heavy lines indicate projection at right angles to the plane of the page.

In FIG. 1 a spike assembly is provided in the form of a "comb" 103 structure or cartridge of five spikes 101 that extend from a spike base 102. In a first bending operation, the spike base 102 is bent at a right angle to the spikes 101 where needed. The bent spike assembly is placed in an injection mold that is configured to provide a base 102 for the bird deterrent device. During injection, the spike base 102 is encapsulated by the molten injection material 104, with solidification fixing the protruding comb of spikes 101 in place. A second bending operation serves to orient the individual spikes 101 as desired to deter avian pests. This can occur before or after injection molding of the base where the spikes 101 are located.

It should be appreciated that such combs can be placed in a series or other array by way of connecting bridges that serve to join two or more spike bases, to form a complex bird deterrent device that includes a number of bird deterring subunits. It should be appreciated that the individual operations of the process shown in FIG. 1, such as bending and placement, are readily automatable.

It should also be appreciated that an embodiment similar to that shown in FIG. 1 can be provided by providing a sheet of material, a portion of which is bent to provide a spike base that is inserted into the injection mold. In such an embodiment individual spikes can be provided by a cutting operation (for example, with an automated laser cutter) following injection, and the individual spikes thus provided can be manually or automatically bent into the desired orientations.

In another embodiment of the inventive concept, a continuous wire can be used to produce both elongated and support portions of individual spikes of a bird deterrent device. For example, a length of wire can be bent into a series of angled turns that provides a planar configuration with a serpentine pattern, with parallel linear segments joined at alternating ends by loops. The loop portions across one set of ends can be bent in a second, perpendicular plane to provide a support for the wire structure when encapsulated within the molded base. Following insertion of the support portion of the wire structure into the mold and injection the remaining exposed loops can be trimmed to provide individual spikes. An example of such an embodiment is shown in FIG. 2, where heavy lines indicate projection out of the plane of the page.

Figure 2:
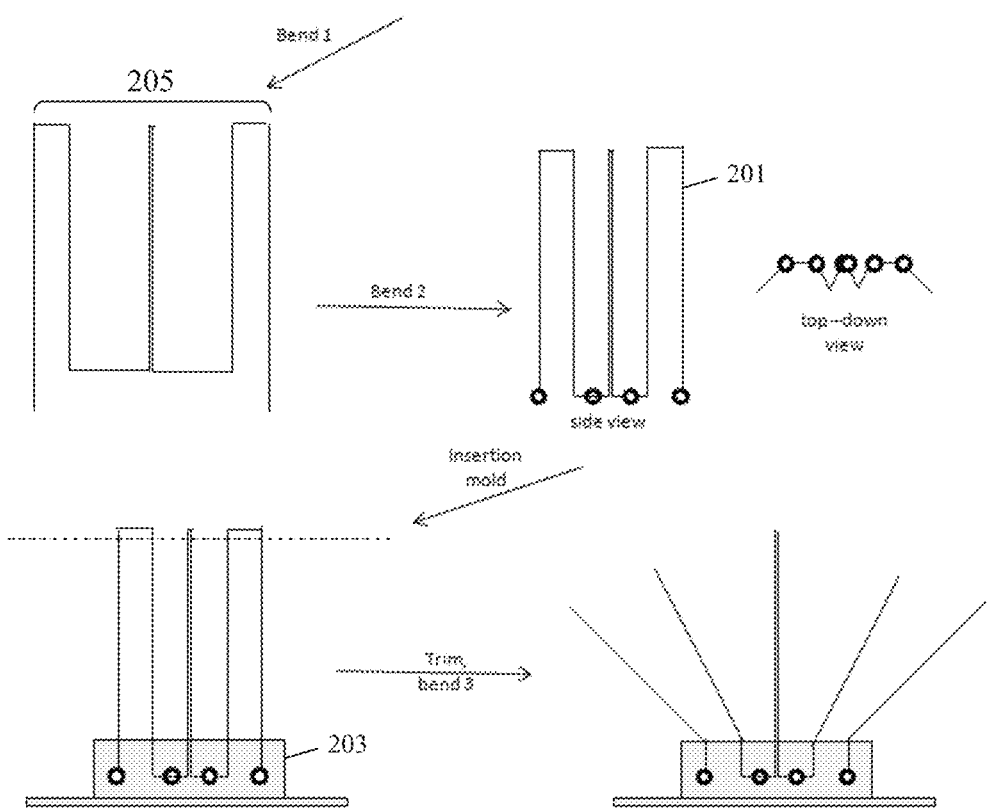
FIG. 2 is an embodiment of the present invention in which a linear piece of wire is bent into a serpentine pattern in a first bending operation.

In the example shown in FIG. 2, a linear piece of wire 205 is bent into a serpentine pattern in a first bending operation. A second bending operation produces a series of bends in one set of terminal loops that are at approximately right angles to the plane of the serpentine pattern, bringing what will become the individual spikes 201 into the desired separation distance, and providing structures that will stabilize the spikes in molded base 204 of the final assembly. Following injection molding trimming of the exposed loop provides individual wire spikes 201 with supporting structures embedded in the material of the molded base 204. The individual wire spikes 201 can then be bent into the desired configuration to deter avian pests. As shown, the serpentine pattern can be adjusted to provide different spacing between individual spikes. In the example in FIG. 2, six wire spikes are provided with the two central wire spikes closely spaced to emulate the pattern of the bird deterrent device shown in FIG. 1. It should be appreciated that the individual steps of shown in FIG. 2 are readily automatable, and that the described device and method can utilize a common and readily obtainable wire feedstock.

It should also be appreciated that the serpentine pattern of FIG. 2 can be adapted to accommodate a complex bird deterrent device that includes two or more coupled bird deterrent units. For example, in such an embodiment the wire segment can be bent into a first serpentine arrangement, where the portion of the wire corresponding to the terminal spike ends in a segment that is bent at a right angle to the first serpentine arrangement and bridges to a second serpentine arrangement that is aligned with a second portion of a complex mold that corresponds to a second bird deterrent unit base. This can be repeated at the opposite end to provide a connection to a third serpentine arrangement, with the pattern repeating to reach the desired length. Such bridging segments can be removed in a trimming operation that follows injection.

Figure 3:
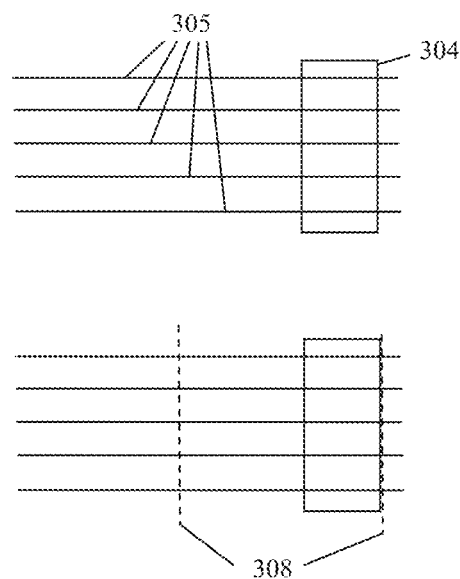
FIG. 3 is an embodiment of the present invention in which a plurality of wires is inserted through a mold, and after molding of the device's base, the plurality of wires can be cut (and bent if needed) to form the deterrent device.
Figure 4A:
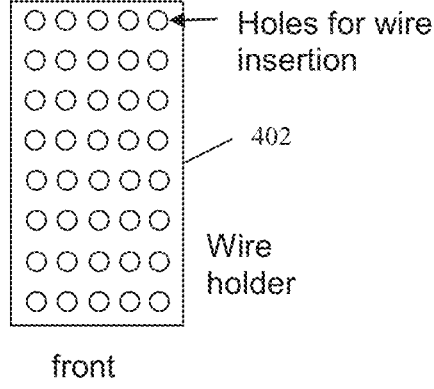
FIGS. 4A-4D are embodiments of the present invention in which a plurality of wires are be individually fed into a mold via a manual or automated process.
Figure 4B:
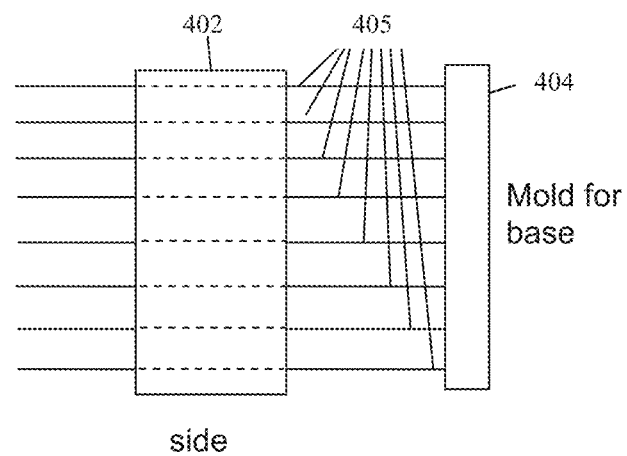
Figure 4C:
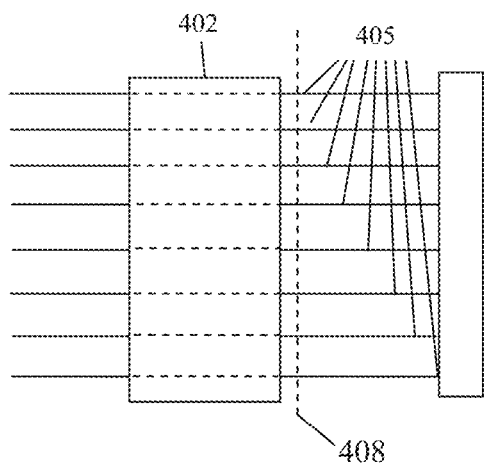
Figure 4D:
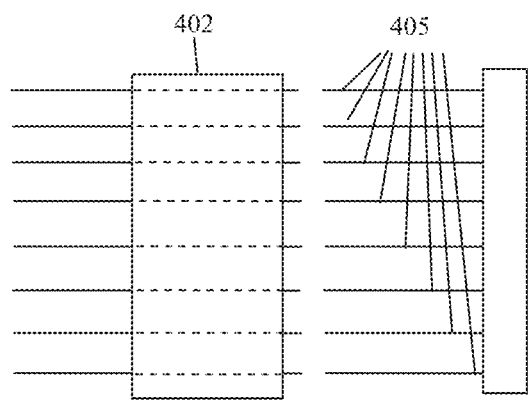

In yet another contemplated embodiment shown below in FIG. 3, a plurality of wires 305 is inserted through a mold 304, and after molding of the device's base, the plurality of wires 305 can be cut 308 (and bent if needed) to form the deterrent device.

It is still further contemplated that a plurality of wires 405 can be individually fed into a mold 404 via a manual or automated process. See FIGS. 4A-4D below. For example, the machine that manufactures the device can be fed a plurality of wires 405, whether a plurality of long wires to be cut during manufacture or individual wires that are precut to the proper length. The base can then be molded around the wires, and the wires subsequently cut 408. The wires extending from the wire holder 402 can then be advanced into the mold 404 for insertion into the next device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A device for deterring avian pests comprising:
   a comb having a spike base (102) from which extend at least first, second, and third elongated spikes (101);
   the spike base (102) encapsulated within an elongated molded device base (104), with the first, second, and third spikes (101) extending up through an upper portion of the device base (104), and wherein a portion of each of the first, second, and third spikes extending upwards from the spike base of the comb, is laterally encompassed by the device base (104); and
   the first, second, and third spikes (101) having bends that distribute their respective top portions in a non-planar, non-colinear fashion.

2. The device of claim 1, wherein the first spike comprises a wire.

3. The device of claim 2, wherein the first wire has a bend within the spike base.

4. The device of claim 1, wherein the first spike and the second spike are comprised of a magnetically responsive material.

5. The device of claim 1, where bottom end portions of the first, second, and third spikes are co-linear within the device base (104).

6. The device of claim 1, wherein top portions of the at least the first and third spikes extend laterally from the device base (104).

7. The device of claim 1, wherein individual openings are oriented vertically with respect to the device base (104).

8. The device of claim 1, wherein the spike base (102) is positioned above a bottom portion of the device base (104).

* * * * *